United States Patent
Brown et al.

(10) Patent No.: US 10,177,845 B2
(45) Date of Patent: Jan. 8, 2019

(54) LOCATION TRACKING USING SHORT-RANGE INFRARED TRANSMISSION

(71) Applicant: ADOBE SYSTEMS INCORPORATED, San Jose, CA (US)

(72) Inventors: James Brown, Orem, UT (US); Jared Bellows, Pleasant Grove, UT (US)

(73) Assignee: Adobe Systems Incorporated, San Jose, CA (US)

( * ) Notice: Subject to any disclaimer, the term of this patent is extended or adjusted under 35 U.S.C. 154(b) by 101 days.

(21) Appl. No.: 15/353,674

(22) Filed: Nov. 16, 2016

(65) Prior Publication Data

US 2018/0138975 A1 May 17, 2018

(51) Int. Cl.
| | |
|---|---|
| H04B 10/114 | (2013.01) |
| H04B 10/50 | (2013.01) |
| H04W 4/04 | (2009.01) |
| H04B 1/3827 | (2015.01) |

(52) U.S. Cl.
CPC ........... *H04B 10/114* (2013.01); *H04B 1/385* (2013.01); *H04B 10/50* (2013.01); *H04W 4/043* (2013.01)

(58) Field of Classification Search
CPC ............................... H04W 4/043; H04B 1/385
See application file for complete search history.

(56) References Cited

U.S. PATENT DOCUMENTS

| | | | | |
|---|---|---|---|---|
| 2003/0020993 A1* | 1/2003 | Ternullo | .................. | G06F 11/10 398/126 |
| 2012/0214515 A1* | 8/2012 | Davis | .................... | H04W 4/023 455/456.3 |
| 2013/0244691 A1* | 9/2013 | Kelly | .................... | H04W 4/043 455/456.1 |
| 2014/0141796 A1* | 5/2014 | Marti | .................... | G01S 5/0252 455/456.1 |
| 2014/0244207 A1* | 8/2014 | Hicks | ....................... | G01C 3/00 702/150 |
| 2014/0285338 A1* | 9/2014 | Davis | .................... | H04W 4/023 340/539.13 |
| 2015/0380003 A1* | 12/2015 | Davis | .................... | H04W 4/023 700/94 |
| 2016/0259329 A1* | 9/2016 | High | ........................ | E01H 5/12 |
| 2016/0358459 A1* | 12/2016 | Singhar | ................. | G08C 17/02 |
| 2017/0290077 A1* | 10/2017 | Nilsson | .................. | H04L 67/12 |

* cited by examiner

*Primary Examiner* — David Payne
*Assistant Examiner* — Omar S Ismail
(74) *Attorney, Agent, or Firm* — Brake Hughes Bellermann LLP

(57) ABSTRACT

Provided are methods and systems for improved user tracking via the exchange of information over narrow-beam infrared (IR) transmission. IR receivers are positioned around a venue. A limited-range, narrow-beam IR transmitter associated with a user sends IR signals that are received by the IR receiver when the IR transmitter is close enough to the receiver. The receiver then transmits signal data from the received signal to a back-end location tracking system (LTS) that aggregates and processes the received signal data as a detection event. Based on the detection event, the LTS determines the location of the IR receiver hence the location of the user. Because of the limited transmission range of the IR transmitter, analyzing the detection event allows precise determination of the user's location, orientation, and/or movements within the venue. The LTS can also determine the identity of the user.

19 Claims, 8 Drawing Sheets

Docket No. 06357.020US1 (P6342)
PATENT

US 10,177,845 B2

LOCATION TRACKING USING SHORT-RANGE INFRARED TRANSMISSION

TECHNICAL FIELD

The present disclosure relates generally to location determination, and more particularly to methods and systems for determining user location relative to another object or another user via the use of short-range infrared transmissions.

BACKGROUND iBeacons and other radio frequency (RF)-based techniques are used to track visitors who visit stores and other venues. While these techniques are sufficient for coarse location determination, they generally fail to provide sufficient information about a visitor to identify the particular areas of a venue a user visits or the items or people with which the user interacted. For example, such techniques are generally not specific enough to identify that a user stopped to look at a particular item or portion of a shelf along an aisle of a store. Similarly, conventional techniques are not sufficiently granular to distinguish when a user at a conference communicates with another user (as opposed to simply being relatively nearby without interacting with the other user).

In addition to iBeacons and other RF-based tracking techniques, other conventional tracking techniques rely on a mobile device carried by a user (e.g., phones, tablets, wearables, etc.) to track the user. For example, a tracking system may rely on triangulation of Wi-Fi signals and/or global positioning system (GPS) signals associated with a user's mobile phone to track the user. Such techniques, however, require the user to carry a mobile device and generally rely upon the user cooperation and effort to load and use a particular application on the mobile device. In addition, these techniques also generally lack sufficient granularity to accurately identify the particular areas of a venue visited or the people or items with which the user interacted.

Additional techniques track users via video cameras, often combined with vision processing/facial recognition software. Such techniques, however, are often expensive to deploy and generally, like the previously discussed techniques, also do not provide sufficient information to accurately identify the particular areas of a venue visited or the people or items with which the user interacted.

SUMMARY

Methods and systems for determining a user location at a venue using infrared (IR) transmissions are provided. A location tracking system (LTS) receives a detection event from an IR receiver deployed in a venue. The detection event is detected based on the IR receiver receiving an IR signal from an IR transmitter of a user at the venue. After the IR receiver receives the IR signal, for example, the IR receiver transmits signal data to the LTS. The LTS then determines from the received signal data a receiver location of the IR receiver at the venue. Based on the location of the IR receiver, the LTS associates the receiver location of the IR receiver with the user. The LTS then determines a user location of the user at the venue based on the receiver location associated with the user, a limited transmission range of the IR transmitter, and a narrow-beam characteristic of the transmitter.

In some embodiments, the user location is further based on a narrow-beam characteristic of the IR transmitter. For example, the narrow-beam characteristic of the IR transmitter provides a beam of less than about 90 degrees, while the limited transmission range is less than about 1.0 meter.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

The features, embodiments, and advantages of the present disclosure are better understood when the following Detailed Description is read with reference to the accompanying drawings.

DETAILED DESCRIPTION

Overview

Figure 1A:
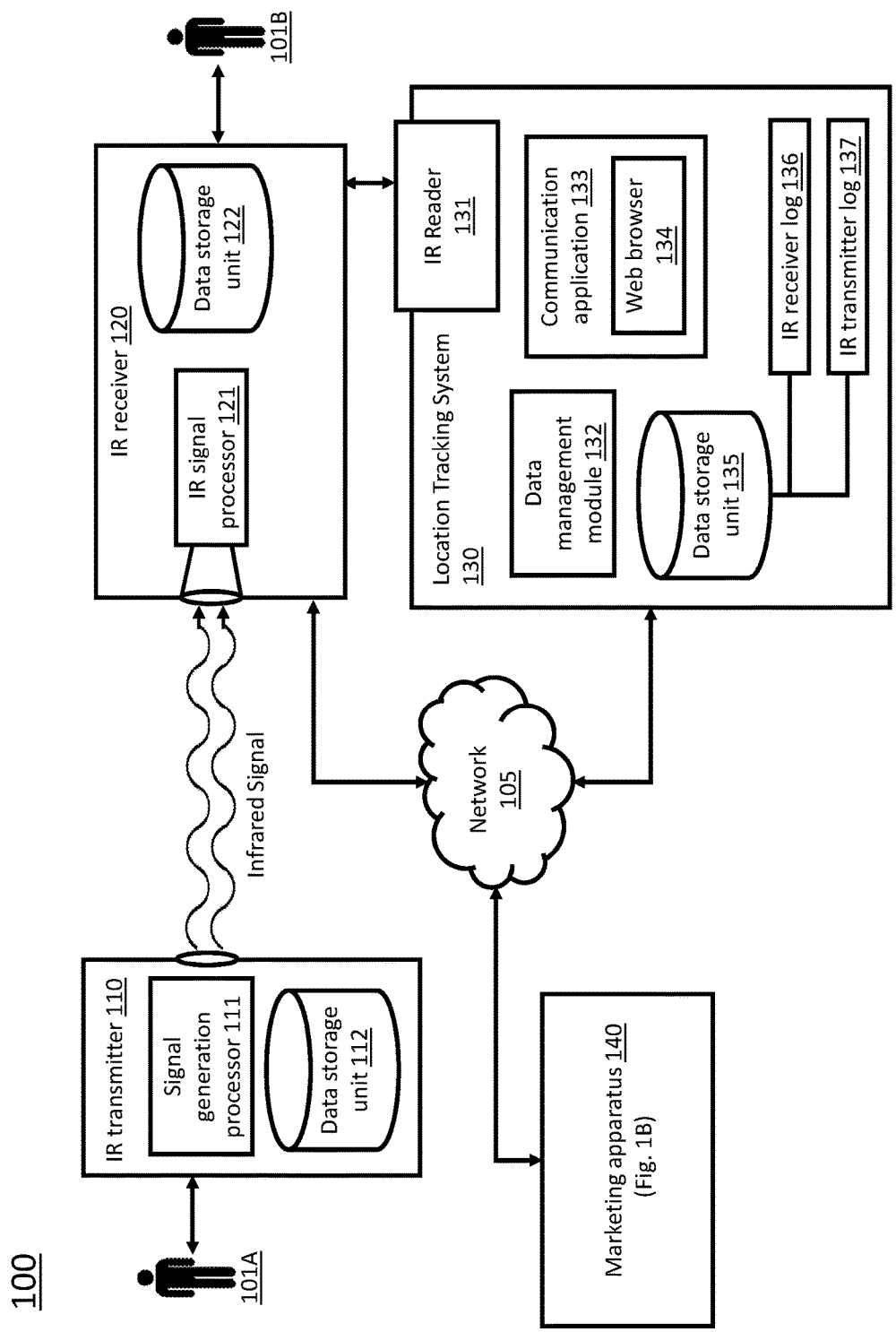
FIG. 1A is a block diagram of a computer network environment and system for determining a user location at a venue, in accordance with certain example embodiments.

As described herein, provided are techniques for improved user tracking via the exchange of information over narrow-beam infrared (IR) transmission. IR receivers are positioned around a venue. A limited-range, narrow-beam IR transmitter associated with a user sends IR signals that are received by the IR receiver when the IR transmitter is close enough to the receiver. As the user walks around the location, for example—and when the user is close enough to one of the infrared receivers for the receiver to detect a signal from the user-associated IR transmitter—the receiver detects the IR signal from the IR transmitter. The receiver then transmits signal data from the received signal to a back-end location tracking system (LTS) that aggregates and processes the received signal data as a detection event. Based on the detection event, the LTS determines the location of the IR receiver hence the location of the user. Because of the limited transmission range of the IR transmitter, analyzing the detection event allows precise determination of the user's location, orientation, and/or movements within the venue.

More particularly, use of IR receivers in conjunction with IR transmitters having a limited (short) range transmission and a narrow-beam characteristic results in very specific IR transmitter-receiver communications. That is, the focused, short range of the transmitted IR single greatly reduces the likelihood of non-specific communications between the IR transmitter and IR receiver. Much more precise information is thus obtained regarding the location and activities of the user. With the deployment of the narrow-beam IR receivers in particular locations in the venue and association of the narrow-beam IR transmitters with a user, a tracking system such as the LTS described herein can make precise determinations about the user's location. For example, the LTS can determine that the user visited a particular area of the venue, stood in front of an object at the venue, or interacted with anther user.

In certain examples, the user location changes as the user moves throughout the venue. In one example, multiple IR receivers are positioned around the store, such as on shelves within a grocery store. One or more IR transmitters are then associated with the user, such as on a shopping cart the user pushes through the store aisles. As the cart (and user) moves through the aisles, the IR transmitter on the cart transmits IR signals to the IR receivers. To accommodate a narrow-beam characteristic of the IR transmitter, the transmitters can be positioned on the cart so that they point towards the shelves. When the IR receivers receive a limited IR signal from the IR transmitter, the receivers relay the signal data to the LTS.

The LTS then determines, from the location of the IR receivers receiving the signals, the path that the user travels when moving through the store. The LTS can also determine the speed and velocity of the user, including whether the user spends a longer time in a particular area of the store. In certain examples, multiple IR transmitters are positioned on the cart such that the LTS can determine the position/orientation of the cart relative to the aisle. For example, the LTS can determine that the user's cart was facing a specific direction.

In other examples, the location of the user is in front of or beside an object. For example, in the shopping example above, the narrow-beam IR receivers can be positioned on one or more objects in the store, such as a specific product that is offered for sale. When the user moves the cart in front of the object, the narrow-beam IR receiver detects the narrow-beam transmitted signal and relays the signal data to the LTS. The LTS can then determine that the user placed the cart in front of the object.

In certain examples, a user, such as a loyalty program member, agrees to wear a narrow-beam IR transmitter to receive discounts. In such examples, the LTS can determine—based on the communications between the user-worn IR transmitter and the item-associated IR receiver—that the user location was in front of or beside a particular object, such as an item on the store shelf. Then, at checkout, items that the user actually purchases can be correlated with the user's identity and the user's activity in the store to better market to the user. For example, a user that stood in front of an item for an extended period of time but did not purchase an item could be sent a coupon for the item, thus encouraging the user to purchase the item.

In certain examples, narrow-beam IR receivers are deployed at specific areas in a venue and/or on specific objects at the venue. Each of the users can optionally register with the LTS system, thus providing any personal information they wish to share with other users and/or selecting preferences for notifications they may wish to receive, such as marketing notifications or emails regarding the art they have viewed. Each user is then provided a narrow-beam IR transmitter, such as a smart badge that includes both a narrow-beam IR receiver and a narrow-beam IR transmitter with limited range.

As the user with the smart badge walks around the location, the LTS determines the location of the user relative to a specific location in the venue or an object. For example, if the user visits a certain area having an IR receiver and the IR receiver detects a transmitted IR signal from the user's smart badge, the LTS can determine that the user visited the specific area. And, by analyzing data from multiple IR receivers, the LTS can track the user's path, speed, and velocity through the venue. If an IR receiver is attached to an object at an exhibition booth, for example, and the IR receiver can detect the user's presence at the booth. The LTS can then determine that the user visited the particular booth and stood in front of the object. The LTS can utilize the user's location at the booth to market to the user, such as by sending the user information about the company exhibiting the booth.

In other examples, the LTS tracks user location relative to other users, such as relative to other conference attendees, with the user of smart badges. Smart badges can be worn like traditional name badges that identify the user with a printed name or credential information and also include IR transmission components. In one example, each smart badge includes both an IR transmitter and an IR receiver. When a user wearing a smart badge on his torso stands in front of another user wearing a smart badge, one user's badge IR transmitter will communicate with the other user's badge IR receiver. This provides signal data indicating the user's interaction with the other user. The information is ultimately provided to the LTS system for processing. The LTS system uses the signal data and the user's information to identify the user location near the other user. Once the LTS determines the user's location near the other user, the LTS can provide information about the interaction to one or both of the users, conference coordinators, marketers, and/or other interested parties. The LTS can, for example, facilitate a contact information exchange between the users, such as via an email sent to each user.

As those skilled in the art will appreciate, the techniques described herein provide numerous advantages over conventional tracking systems, for example because of the advantages conferred by narrow-beam IR signaling. As noted above, the range of the IR signals is limited so that the granularity of the user location information is determined more precisely and tailored for the particular user interactions being detected. Moreover, the directionality of the IR signal allows the orientation of the user or the user's cart, basket, or other device to be tracked, as described herein. For example, based on the direction of the IR signals being sent and received from smart badges worn on the front of a user's torso, the techniques described herein can be used to determine whether two users are facing one another within a conversational distance, and thus likely interacting. Hence, the IR-based methods and systems presented herein generally allow control over both the direction and range of the transmission of the IR signals to accurately identify the particular areas that the user visited or the people or items with which the user interacted. And notably, such tracking is accomplished with a low-cost IR system that is deployed on equipment of the venue itself, such as on a shopping cart, shopping basket, or smart badge. The techniques also advantageously do not rely on the user carrying a mobile device as do some conventional tracking methods.

Terminology

As used herein, the phrase "infrared," abbreviated "IR," refers to the form of electromagnetic radiation having a wavelength just greater than that of the red end of the visible light spectrum but less than that of microwaves. Infrared radiation has a wavelength from about 800 nm to 1 mm, and is emitted particularly by heated objects. An "infrared signal" is an emission of the infrared electromagnetic radiation, such as from an IR transmitter.

As used herein, the phrases "infrared transmitter" or "IR transmitter" refer generally to hardware that emits an infrared signal. As those skilled in the art will appreciate, the transmitter contains a light source, such as an LED. The light source can be turned on and off to generate a code. The transmission properties of the transmitter can be adjusted, for example, such as by adjusting the intensity of the light source and the angle that that the infrared signal is emitted.

As used herein, the phrase "limited transmission range" is used to describe an IR transmitter for which for which the transmission properties have been adjusted in a manner that restrict the distance the IR signal travels when the transmitter emits the IR signal. Such limited transmission range transmitters typically emit an IR signal that travels only about 0.5 meters to about 2 meters from the transmitter.

As used herein, the phrase "narrow-beam characteristic" is used to describe a feature on an IR transmitter that has been configured to emit a focused (rather than broad) IR signal as the IR signal passes from the IR transmitter. As used herein, an IR transmitter having a narrow-beam characteristic typically emits an IR signal at an angle of about 90° or less, such as an emission angle of about 5°, 10°, 15°, 20°, 30°, 35°, 40°, 45°, 50°, 55°, 60°, 65°, 70°, 75°, 80°, 85°, 90°, or 95°. In certain example embodiments described herein, the IR transmitter can have a narrow-beam characteristic and/or a limited transmission range, depending on how the IR transmitter is configured.

As used herein, the phrases "infrared receiver" or "IR receiver" refers generally to hardware that detects and IR signal from an IR transmitter. As those skilled in the art will appreciate, the IR receiver detects signal via a photodiode or a phototransistor (usually the latter). Typically, the receiver is also equipped to decode the received IR signal and then output the decoded signal data to another device. The IR receiver also typically outputs a code to uniquely identify the infrared signal that it receives. Because infrared is light, IR receivers require line-of-sight visibility for the best possible operation. There are many different kinds of infrared receivers that can be customized and configured based on voltage, carrier frequency, transmission distance, power dissipation, packaging type and supply current.

As used herein, the phrase "signal data" refers to the digital information that an IR receiver communicates to anther device and/or system. As those skilled in the art will appreciate, the signal data may include, for example, an identity of the IR transmitter from which the IR receiver received the IR signal, an identity of the IR receiver, and the time the IR receiver received the IR signal. In certain example embodiments, the signal data may include the length of time that the IR receiver received the IR signal.

As used herein, the phrase "detection event" refers to an indication that a particular IR receiver has received an emitted IR signal from a particular IR transmitter. A detection event can be identified, for example, from IR signal data that that the IR receiver transmits to a second device and/or system that is responsible for analyzing the signal data.

As used herein, the term "venue" refers to a particular location defined by one or more geographic or communication-based boundaries. Examples of venues include retail stores, buildings, transit stations, shopping malls, homes, business complexes, sports facilities, and portions of these.

As used herein, the phrase "user location" refers to the position of the user relative to the user's surroundings. For example, a user location may be a specific area in a venue, such as a user standing in front of an exhibition booth. In another example, the user location may be directly facing the torso of another user. In another example, the user location may be facing an object. In another example, the user location may be in a store aisle, such as in a particular area of the store aisle.

Example System Architecture

Turning now to the drawings, in which like numerals indicate like (but not necessarily identical) elements throughout the figures, example embodiments are described in detail.

FIG. 1A is a block diagram of a computer network environment and system for determining a user location at a venue, in accordance with certain example embodiments. As depicted in FIG. 1A, the exemplary operating environment 100 includes an IR transmitter 110, an IR receiver 120, a location tracking system 130 (or "LTS"), and a marketing apparatus 140 that are configured to interact with each other either directly or over the network 105.

The network 105 includes a wired or wireless telecommunication means by which network devices 120, 130, and 140 interact. For example, the network 105 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, near field communication ("NFC"), Wi-Fi, or any combination thereof or any other appropriate architecture or system that facilitates the communication of signals, data, and/or messages.

Each device 120, 130, and 140 of the system 100 includes a communication module (not shown) capable of transmitting and receiving data over the network 105 as shown. As those skilled in the art will appreciate, the LTS 130 and the marketing apparatus can be a desktop computer, laptop computer, tablet computer, smart phone, handheld computer, personal digital assistant ("PDA"), or any other wired or wireless, processor-driven device. In the example embodiment depicted in FIG. 1, the network devices 130 and 140 are operated by end-users or consumers, electronic content management system managers or operators, separate digital sign system managers, merchant operators, or combinations thereof.

The IR transmitter 110 represents the component of the exemplary operating environment 100 responsible for transmitting an infrared signal to the IR receiver 120. As shown, the IR transmitter 110 is associated with the user and configured to emit a narrow-beam IR signal and/or IR signal with limited transmission range. In certain example embodiments, the IR transmitter may include a signal generation processor 111 that represents the component of the IR transmitter that controls the signal generated from the IR transmitter 110. For example, the signal generation processor 111 may control the signal intensity of the light source (not shown) of the IR transmitter 110, as well as the information that is encoded in the emitted IR signal. In certain example embodiments, the IR transmitter 110 may include a data storage unit 112. The data storage unit 112, for example, may store retrievable identity information about regarding the IR transmitter 110, as well as preconfigured settings or information that the signal generation processor 111 may draw on to generate the IR signal. The example data storage unit 112 can include one or more tangible computer-readable media, and can be either stored on the IR transmitter 110 or logically coupled to the IR transmitter 110. The data storage unit 112 can include on-board flash memory and/or one or more removable memory cards or removable flash memory. As those skilled in the art will appreciate, other customary electronic components (not shown) may be associated with the IR transmitter 110.

The IR receiver 120 represents the component of the exemplary operating environment 100 responsible for receiving the IR signal from the IR transmitter 110, generating signal data from the received IR signal, and then relying the signal data to the LTS 130. The IR receiver 120 includes, for example, a IR signal processor 121 that processes the received IR signal, such as by decoding the received IR signal. The IR signal processor 121 also, for example, converts the decoded received IR signal into the IR signal data, which the communication module (not shown) transmits to the LTS 130. In certain examples, the IR signal receiver 120 communicates directly with the LTS 130, such as via an IR reader 131 of the LTS 130 (described below). Additionally or alternatively, the IR signal receiver 120 communicates with the LTS 130 via the network 105.

In certain example embodiments, the IR receiver 120 may include a data storage unit 122 for use in storing retrievable information, such as information identifying the IR receiver 120. In certain example embodiments, the data storage unit 122 may store signal data generated by the IR signal processor 121 until such time the signal data can be transmitted to the LTS 130. The example data storage unit 122 can include one or more tangible computer-readable media, and can be either stored on the IR receiver 120 or logically coupled to the IR receiver 120. The data storage unit 122 can include on-board flash memory and/or one or more removable memory cards or removable flash memory. As those skilled in the art will appreciate, other customary electronic components (not shown) may be associated with the IR receiver 120.

The location tracking system 130 represents the component of the exemplary operating environment 100 responsible for determining that location of a user 101A based on a detection event. The LTS 130 can include, for example, IR reader 131 for reading an IR receiver 120 so as to obtain the signal data from the IR receiver 120. The LTS 130 also includes a data analytics module 132 that, for example, represents the system component that is responsible for associating IR receiver identities with IR receiver locations and associating IR transmitter identities with users. The data analytics module 132 is also is responsible for reading and analyzing the received signal data to identify a detection event. The data analytics module 132 also, for example, analyzes the signal data for information associated with the detection event, such as the identity of the IR transmitter 110, the identity of the user 101A associated the IR transmitter 110, and the identity of the IR receiver 120 (including the location of the IR receiver 120).

In certain example embodiments, the LTS 130 includes a communication application 133 and associated web browser 134. A user 101A can use the communication application 111, such as a web browser 134 application or a stand-alone application, to view, download, upload, or otherwise access the LTS. For example, the web browser 134 of the communication application 133 may provide a user interface (not shown) that the user 101A utilizes to provide information to the LTS 130 about the user 101A. For example, the user 101A may input user information to the LTS 130 via a user interface of the web browser 134, such as the user's name and contact information, when registering for a conference, a gathering, or with a merchant loyalty program. The web browser 134 may also provide a portal where an operator of the LTS can enter information about IR transmitters and IR receivers that are associated with the LTS 130

As shown in FIG. 1A, in certain example embodiments LTS 130 may include a data storage unit 135 for use in storing retrievable information, such as user-provided contact information and information about the location and/or identity of IR receivers 120 and IR transmitters. In certain example embodiments, the data storage unit 135 may store such user-provided contact information and information about the location and/or identity of IR receivers 120 and IR transmitters in an IR receiver log 136 or an IR transmitter log 137. The data analytics module 132 can then retrieve information about the user 101A, for example, from the data storage unit 135 and associate the user 101A with the detection event. The example data storage unit 135 can include one or more tangible computer-readable media, and can be either stored on the LTS 130 or logically coupled to the LTS 130. The data storage unit 135 can include on-board flash memory and/or one or more removable memory cards or removable flash memory.

In addition to the components described herein, the exemplary operating environment 100 can include an optional marketing apparatus 140. The marketing apparatus 140, for example, is responsible for providing marketing information to a user 101A, such as after the LTS 130 determines the location of the user 101A as described herein. For example, if the LTS 130 places the user 101A in front of an item at a grocery store for an extended period of time, but on checkout it is determined that the user 101A did not purchase the item, the marketing apparatus 140 may send a coupon to the user 101A for the item. The details of the optional marketing apparatus 140 are described in FIG. 1B.

Figure 1B:
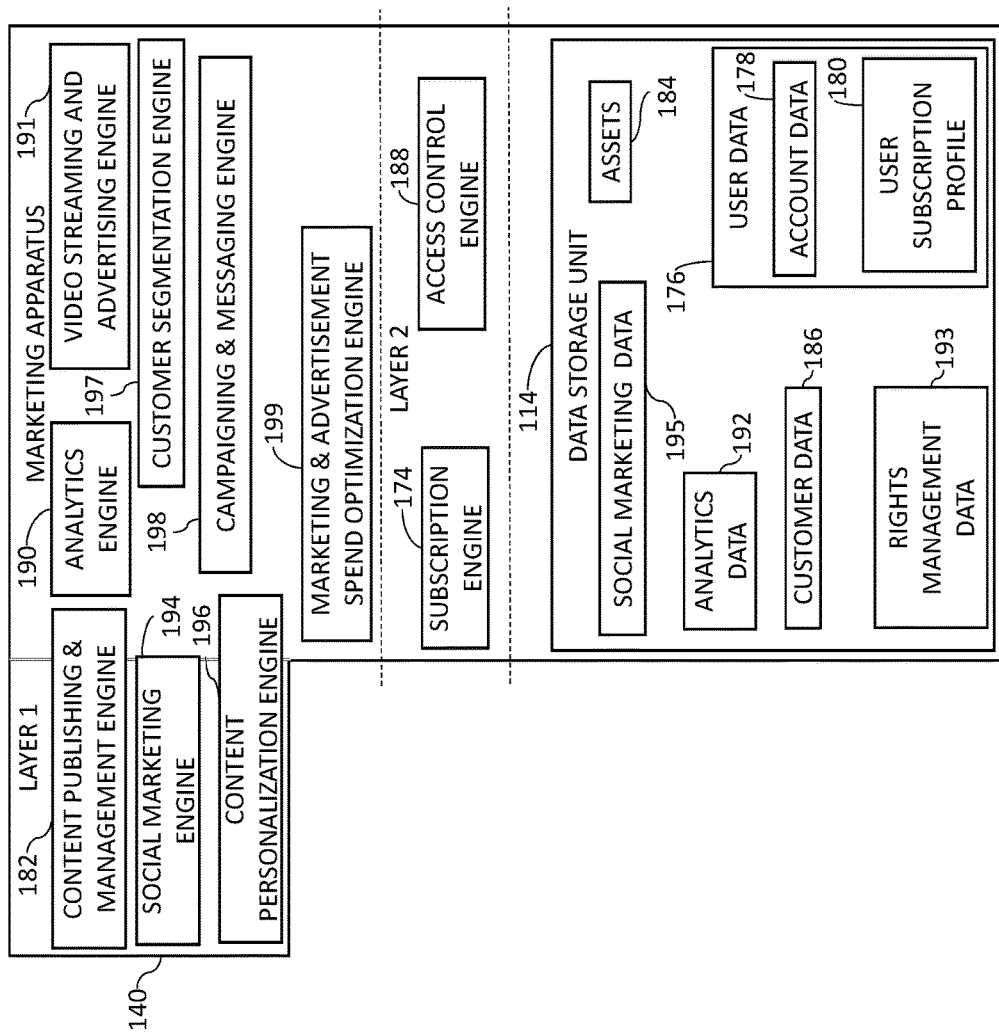
FIG. 1B is a block diagram of a marketing apparatus for use in conjunction with the methods and systems described herein, in accordance with certain example embodiments.

FIG. 1B is a block diagram of a marketing apparatus for use in conjunction with the methods and systems described herein, in accordance with certain example embodiments. As shown, the optional marketing apparatus 140 includes one or more engines for providing one or more digital experiences to the user 101A. The marketing apparatus 140 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The marketing apparatus 140 also includes a data storage unit 114. The data storage unit 114 can be implemented as one or more databases or one or more data servers. The data storage unit 114 includes data that is used by the engines of the marketing apparatus 140.

In one embodiment, the marketing apparatus 140 can be divided into two layers of engines, i.e., Layer 1 including core engines that provide workflows to the user 101A and Layer 2 including shared engines that are shared among the core engines. Any core engine can call any of the shared engine for execution of corresponding task. In another embodiment, the marketing apparatus does not have layers and each core engine can have an instance of the shared engines. In either embodiment, each core engine can access the data storage unit 114 directly or through the shared engines.

The user 101A of a user device (not shown) visits a webpage or an application store to explore applications supported by the marketing apparatus 140. The marketing apparatus 140 provides the applications as a software as a service (SaaS), or as a standalone application that can be installed on the user device, or as a combination. The user 101A creates an account with the marketing apparatus 140 by providing user details and also by creating login details. Alternatively, the marketing apparatus 140 can automatically create login details for the user 101A in response to receipt of the user details. The user 101A can also contact the entity offering the services of the marketing apparatus 140 and can get the account created through the entity. The user details are received by a subscription engine 174 and stored as user data 176 in the data storage unit 114. In some embodiments, the user data 114 further includes account data 178 under which the user details are stored.

The user 101A can opt for subscription of one or more engines of the marketing apparatus 140. Based on subscription details of the user 101A, a user subscription profile 180 is generated by the subscription engine 174 and stored. The user 101A subscription profile 180 is stored in the data storage unit 114 and indicates entitlement of the user 101A to various products or services. The user 101A subscription profile 180 also indicates type of subscription, i.e. premium subscription or regular subscription.

The marketing apparatus 140 includes a content publishing and management engine 182 that enables the user 101A to create websites and other content. The content publishing and management engine 182 provides an end to end workflow to the user 101A right from creation of content, to hosting of content, to publishing of content, and finally, to management, i.e. editing and republishing, of content. The content publishing and management 182 further includes one or more engines (not shown in FIG. 1B), such as asset management engine, website management engine, mobile content management engine, form management engine, search engine and community management engine to enable one or more workflows. The user 101A can create content, such as forms, mobile application or webpage content, using the content publishing and management 182. The user 101A can either do the creation or can send it for creation to third party via workflows provided through the content publishing and management engine 182. The user 101A then publishes the content and manages it through the content publishing and management engine 182. The user 101A can also create communities or forums for discussions with customers and manage the communities through the content publishing and management engine 182. The content publishing and management engine 182 also provides asset management capabilities including asset searching using various tags and metadata. The content publishing and management engine 182 stores assets 184 in the data storage unit 114. Examples of the assets 182 include, but are not limited to, image, text, document, video, audio, font, and metadata. In addition, the content publishing and management engine 182 enables multisite, i.e. multiple websites and mobile content, management workflows, and commerce, i.e., personalized shopping experiences that incorporate video, social, and other dynamic media, related workflows. For some of the functionalities, such as asset management, the content publishing and management engine 182 can work in conjunction with the creative apparatus 108 and access data from the data storage unit 112.

Each engine of the marketing apparatus 140 also stores customer data 186 for the user 101A in the data storage unit 114. The user 101A or the entity of the user 101A can have one or more customers, including potential customers, and hence, the one or more engines of the marketing apparatus 140 store the customer data 186. The customer data 186 can be shared across these engines or can be specific to each engine. In some embodiments, the access data 184 is a part of the customer data 186. The access to the customer data 186 is controlled by an access control engine 188 which can be shared across the engines of the marketing apparatus 140 or each engine can have one instance of the access control engine 188. The access control engine 188 determines if the user 101A has access to a particular customer data 186 based on the subscription of the user 101A and access rights of the user 101A.

The marketing apparatus 140 also includes an analytics engine 190. The user 101A can enable tracking of the content while creating the content or at any other point. Various methods of tracking can be used. For example, tracking code can be embedded into the content for tracking and sending tracked data to the analytics engine 190. The analytics engine 190 tracks the data and stores tracked data as analytics data 192. The analytics engine 190 tracks the data and performs meaningful processing of the analytics data 192 to provide various reports to the user 101A. In addition, in one embodiment, the analytics engine 190 also acts as a shared engine and is accessible by other engines to obtain meaningful analysis on basis of which other engines can offer various functionalities to the user 101A. In another embodiment, each engine can have an instance of the analytics engine 190 which is customized according to need of that engine. The analytics engine 190 is used for tracking all types of content, such as mobile application, video, image, website, document, advertisement, and also for tracking the assets 184. The analytics engine 190 also supports predictive intelligence to provide predictions based on the analytics data 192. The analytics engine 190 also stitches information tracked from various sources where the content is consumed and provides a holistic view, i.e., 360 degrees' view of the analytics data 192.

The marketing apparatus 140 also includes a social marketing engine 194 for providing social marketing related workflows. The social marketing engine 194 allows the user 101A to share the content on social networks, and then manage the content sharing and associated information, such as posts and comments. For example, the social marketing engine 194 provides recommendations to the user 101A to determine when to post which content and to determine how audience will react to the post, helps the user 101A to respond to queries from viewers of post, and performs other managing related to the post. In addition to the social networks, the social marketing engine 194 also provides workflows to manage content on blog, and other communities. The social marketing engine 194 provides recommendations by tracking the data on social networks and storing the data as social marketing data 195. The social marketing data 195 is then processed by the social marketing engine 194 to determine recommendations. The social marketing engine 194 can automate many manual workflows. For example, the social marketing engine 194 can perform automatic posting of the post at an appropriate time, automatically respond to queries from post viewers and the like. The social marketing engine 194 uses the analytics engine 190 for tracking data on social networks or can source data from the social networks. The social marketing engine 194 can also be a shared engine which can be accessed by various engines of the marketing apparatus 140. Alternatively, the engines can have an instance of the social marketing engine 194 and can directly access the social marketing data 195.

The marketing apparatus 140 also includes a content personalization engine 196. The content personalization engine 196 enables the user 101A to provide different digital experiences to the customers when different customers visit same webpage or same application of the user 101A. The content personalization engine 196 provides various workflows to the user 101A to create different versions of the webpage or the application or the content and to perform A/B testing. Based on the testing, the user 101A may choose to provide different personalization for different sets of customers. The content personalization engine 196 also uses the customer data 186 which can be part of the analytics data 192, in one embodiment, or can be stored separately in another embodiment. The customer data 186 includes customer profiles. The customers, as described herein, also includes mere visitors which are not customers yet. A profile includes one or more attributes of a customer. An attribute, as described herein, is a concept using which the customer can be segmented. Examples of the attribute include, but are not limited to, geographical location, age, gender, purchase capacity, language, habits, browsing trends, or any other attribute using which the customers can be segmented. The customer data 186 is generated by a customer segmentation engine 197 by collecting data from different sources including electronic sources, such as the analytics engine 190, online forms, customer submitting data online, and other online sources, and non-electronic sources including paper forms and other offline sources. The customer data 186 can be shared between users and some of the customer data 186 can be specific to each user and not accessible by other users. The customer segments are used by the content personalization engine 196 to personalize content and show relevant content to the customers. In addition, the content personalization engine provides automated workflows to enable the personalization including providing recommendations for the content that should be shown to a particular customer segment.

The marketing apparatus 140 also includes a campaigning and messaging engine 198 that enables workflows for the user 101A to perform marketing campaigns including sending marketing emails. The campaigning and messaging engine 198 uses the customer data 186 and generates customer segments for performing marketing campaigns. Alternatively, the campaigning and messaging engine 198 uses customer segmentation engine 197 for generating customer segments. A marketing campaign, as defined herein, includes sending marketing messages to customers. The messages can be sent as electronic mails, mobile messages, push to text, social networks, advertisements, or as any other type of message. The campaigning and messaging engine 198 customizes the messages before the messages are send out. For customization, the campaigning and messaging engine 198 provides automated workflows to the user 101A. The user 101A can specify attributes for customer segmentation and the campaigning and messaging engine 198 automatically picks the customers to whom the message is to be sent and also personalizes the message based on the attributes of the customer segment. The campaigning and messaging engine 198 also provides A/B testing option to the user 101A to test which message to send out of two messages. The campaigning and messaging engine 198 also stores different customer segments for each user 101A in the customer data 186. In addition, the content used for creating personalized messages, email identifiers and other data is stored as part of the customer data 186 which can be specific for the user 101A and inaccessible to other users.

The marketing apparatus 140 also includes marketing and advertisement spend optimization engine 199. The marketing and advertisement spend optimization engine 199 helps the user 101A in budget management for running marketing campaigns, showing advertisements on websites, as search results, social advertisements, and other form of advertising. The marketing and advertisement spend optimization engine 199 tracks budget spend of the user 101A and the budget remaining, and based on that performs analysis to recommend advertising channels for maximizing benefit. In addition, the marketing and advertisement spend optimization engine 199 uses the customer data 186 and the analytics data 192, and stitches that data to generate the recommendation. The analytics data 192 includes information on how the marketing content performed. The customer data 186 further indicates what type of customers visited the marketing content and the analytics data 192 further indicates who all among those customers ended up in performing a transaction.

In various embodiments, the customer data 186 also includes data regarding devices used by the customers. The device data is used for stitching customer data. For example, a customer 1 may use device 1 to visit website A. The customer 1 may use device 2 to visit website B. The website A and the website B may belong to the same user. So, instead of considering customer 1 as two different customers the data including at least one common identifier such as email id helps the user 101A to identify that the two different visits were made by the same customer 1. Also, by doing analysis on the customer data 186 and the analytics data 192, richer customer profiles or segments can be generated. Also, devices that correspond to the same customer can be identified resulting in providing more targeted digital experience to the customer and making benefit for the user 101A.

The marketing apparatus 140 also includes a video streaming and advertising engine 191 that helps the user 101A, such as broadcasters, cable networks and service providers create and monetize engaging and personalized viewing experiences. The video streaming and advertising engine 191 can be implemented to provide a software development kit to the user 101A to build and deliver videos to the customers. In addition, the video streaming and advertising engine 191 provides workflows to the user 101A to insert advertisement within the videos and provides recommendations to the user 101A for locations for advertisement insertion. The recommendations are generated using the analytics data 192 which includes information regarding what portions of video was viewed most and other video analytics data, and also using the customer data 186 which includes customer segments who viewed the video and corresponding advertisement. The video streaming and advertising engine 191 also stores rights management data 193 for different videos for the customers of the user 101A. For example, if a video is paid then the video streaming and advertising engine 191 does not provide access to the customer based on the rights management data 193. Using the rights management data 193, the video streaming and advertising engine 191 protects content rights across various devices of the customers. Also, the video streaming and advertising engine 191 includes an authentication engine for authenticating the customers. The customer authentication data can also be stored as part of the customer data 186. The customer authentication data includes login details or other identifiers for the customer.

As those skilled in the art will appreciate, the network connections shown in FIGS. 1A and 1B are examples only, inasmuch as other means of establishing a communications link between the computers and devices can be used. Further, the devices/systems 110, 120, 13, and 140 and their components can have any of several other suitable computer system configurations. In certain example embodiments, one or more of the several components presented herein may be any type of computing device, including for example those discussed in more detail with respect to FIG. 6. Likewise, any modules or applications discussed herein or any other modules (scripts, web content, software, firmware, or hardware) may be performed or accomplished by any modules or application detailed in FIG. 6.

Example Processes

The components of the example operating environment 100 are described hereinafter with reference to the example methods and diagrams illustrated in FIGS. 2-4. The example methods of FIGS. 2-4 may also be performed with other systems and in other environments.

Figure 2:
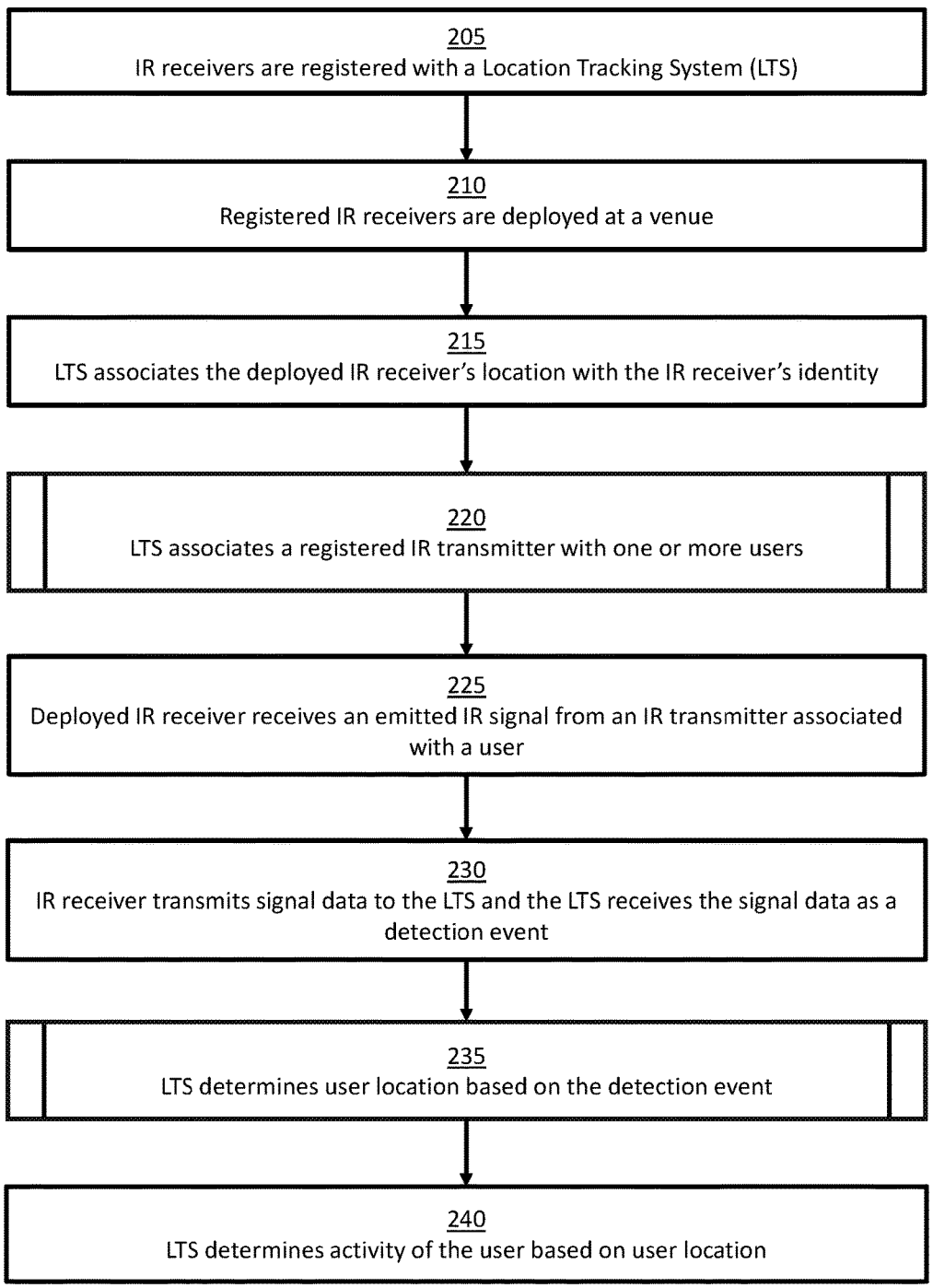
FIG. 2 is a block flow diagram depicting a method for determining a user location at a venue using infrared transmissions, in accordance with certain example embodiments.

FIG. 2 is a block flow diagram depicting a method for determining a user location at a venue using infrared transmissions, in accordance with certain example embodiments.

With reference to FIGS. 1A-1B and 2, in block 205 of FIG. 2, IR receivers 120 are registered with the LTS 130. That is, the identity of one or more IR receivers 120 is recorded in an IR receiver log 136 of the LTS 130. For example, an operator of the LTS 130 may scan the IR receivers 120 via the IR reader so that their identity is recorded with the LTS 130, such as in an IR receiver log 136 of the data storage unit 135 of the LTS 130. Additionally or alternatively, the operator may manually input the identity of each receiver into the LTS 130, such as via the web browser 134 of the LTS 130. The data processing module 132 then records the identity of the receivers in the IR receiver log 136. The IR receiver identity can be any type of unique identifier, such as a series of numbers, letters, or characters. For example, the stored identity may be XYZ for a given IR receiver.

In block 210, the registered IR receivers 120 are deployed at a venue. That is, one or more of the registered IR 120 receivers associated with the LTS 130 are placed at known locations around a venue so that the receivers are in a position to detect an IR signal that is emitted from an IR transmitter associated with a user 101A. In certain example embodiments, it is desirable to determine the location of the user 101A without regard to the actual objects that the user 101A interacts with. To determine the user's location within a conference center, for example, the IR receivers 120 may be attached to the walls in a particular conference room, the tables where users (conference attendees) sit, on exhibit signs or tables of an exhibit, or anywhere else a user 101A may visit. For example, when chairs are organized in rows, the IR receivers 120 may be placed on the back of chairs (and facing the chair behind). In a grocery store, for example, the IR receivers 120 may be deployed on the shelving of the aisles.

In other example embodiments, it is desirable to determine that the user's location is near a particular object, such as directly in front of the object. In such embodiments, the IR receiver 120 are deployed on a specific object. When the venue is a conference center, for example, the object may be a particular exhibit at the conference, such as a registration table at the exhibit. In a grocery store, for example, an IR receiver 120 may be associated with a particular item, such as on a shelf under a particular brand of detergent (or even on the detergent). Or, the IR receiver can be placed on an advertisement for a product at the store, such as a sign or banner.

In certain example embodiments, it is desirable to determine the location of the user 101A near a second user 101B, such as facing the second user 101B. When the venue is a conference center or a social gathering, for example, determining that the user 101A is facing the second user 101B according to the methods and systems described herein provides an indication of a direct an interaction between the user 101A and the second user 101B. In such embodiments, the IR receivers 120 may be deployed on either or both of the users. For example, the IR receivers 120 may be integrated into a wearable device, such as smart badge, that second user 101B wears on his or her torso. When the second user 101B wears the smart badge, the IR receiver 120 faces outward towards the other user 101A.

Regardless of where the IR receivers 120 are deployed, the IR receivers 120 are deployed in a manner where they can interact with an IR transmitter 110 if the IR transmitter 100 is close enough to the IR receiver 120. For example, if the desire is to determine a user's location as standing in front of an object—and the user 101 is to wear a smart badge—the IR receiver 120 is positioned at a height corresponding to the expected height of the IR transmitter 110 on the user's torso. The IR receiver 120 is also positioned to face outwards away from the object where the user 101A is expected to stand, hence facing the anticipated location of the user 101A. By positioning the IR receivers 120 in this manner, the IR receivers 120 are in position to detect the limited range of the IR transmitter 110 and/or the narrow-beam characteristic of the IR transmitter 110 that is part of the smart badge.

In block 215, the LTS 130 associates the deployed IR receiver's location with the IR receiver's identity. That is, the location where each of the IR receivers 120 are placed is recorded, for example—along with the identity of each IR receiver 120 in the IR receiver log 136—such that subsequently retrieving the identity of the IR receiver 120 from the log can be used to determine the deployment location of the IR receiver 120. For example, an operator of the LTS 130 may manually enter into the LTS 130 the location where the IR receiver 120 is deployed, such as via a user interface (not shown) of the web browser 134 of the LTS 30. The data analytics module 132 then receives the entry from the web browser 134 and records the location of the IR receiver 120 in the IR receiver log 136 of the data storage unit 135.

In certain example embodiments, such as when the IR receiver 120 is associated with an item in a store, the operator may scan a bar code associated with the item, and the bar code is then associated with the identity of the IR receiver 120. If a particular IR receiver 120 identified as receiver XYZ is deployed on item 4500X23 (or on a shelf under item 123), for example, the data processing module 132 of the 132 of the LTS 130 links the location of item 4500X23 to IR receiver XYX, such as by recording the 4500X23 code along with the record of the XYZ IR receiver in the IR receiver log 136. If IR receiver XYZ is placed at a location in a venue, such as on a chair in a specific conference room as described above, the location of the XYZ IR receiver as being in the conference room is recorded with the XYZ IR receiver in the IR receive log.

In certain example embodiments, additional information regarding the IR receiver can be recorded in the IR receiver log 136. For example, if the receiver is deployed on a user 101A and/or second user 101B, the name, address, email, or other contact information may be recorded in the IR receiver log 136. If the XYZ IR receiver is placed on a second user 101B, such as with a smart badge associated with the second user 101B, the location of the XYZ IR receiver can be associated with identity of the second user 101B. For example, the name of the second user 101B, John Doe, can be recorded with the XYZ IR receiver in the IR receiver log 136.

In block 230, the LTS associates a registered IR transmitter 110 with one or more users 101A. That is, an IR transmitter 110 is provided to a user 101A so that the LTS 130 can track the location of the user 101A as described herein. In certain example embodiments, the identity of a particular IR transmitter 110 is recorded with the identity of user 101A so that subsequently retrieving the identity of the IR transmitter 110 from the record facilitates identifying the user 101A. The details of block 230 are described in further detail below with reference to FIG. 3.

Figure 3:
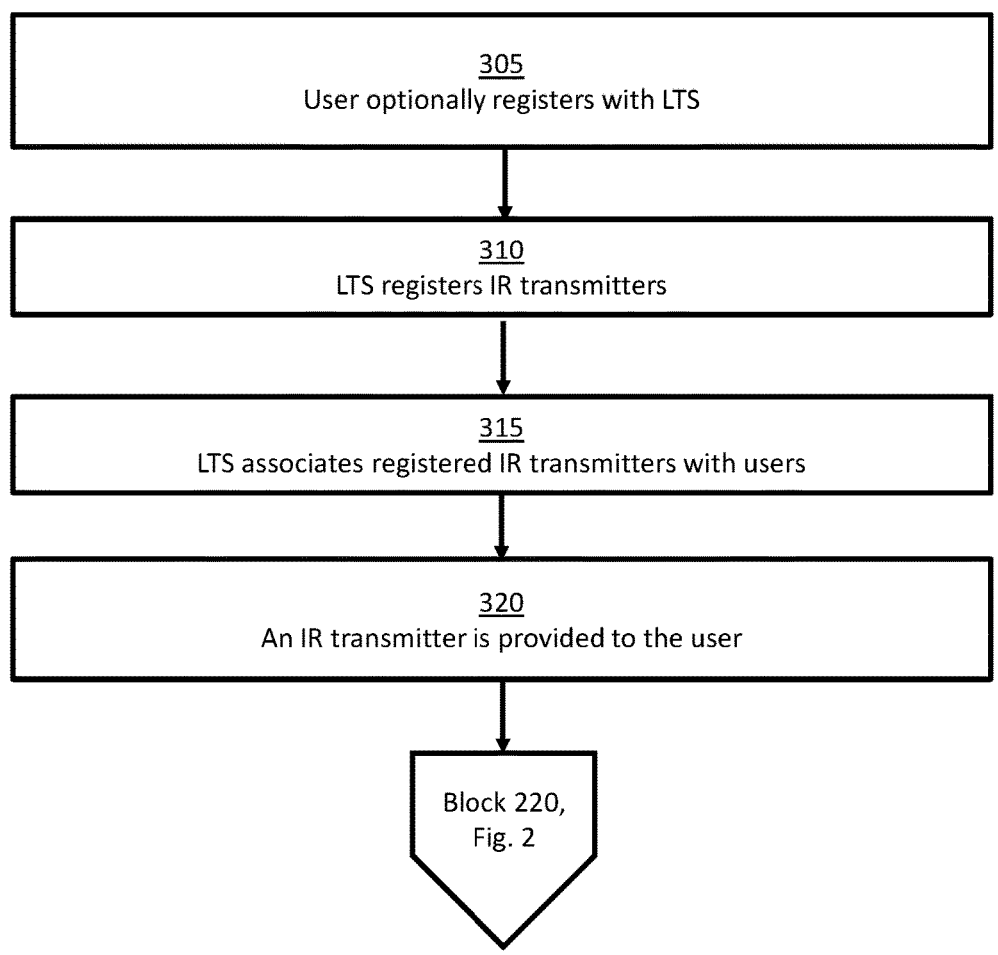
FIG. 3 is a block flow diagram depicting a method for associating an IR transmitter with a user, in accordance with certain example embodiments.

FIG. 3 is a block flow diagram depicting a method for associating an IR transmitter 110 with a user 101A, in accordance with certain example embodiments. As shown in block 305, in certain example embodiments the user 101A optionally registers with the LTS 130. For example, a user 101A attending a conference may provide user information, such as a name, address, email address, or other contact information to the LTS such as via a user interface (not shown) of the web browser 134. The LTS 130 receives the user information, and the data processing module 132 records the user information in user information log on the data storage unit 135. In certain example embodiments, a user 101A may register with the LTS 130 as part of a merchant loyalty program. For example, the user 101A may provide user contact information directly to the LTS 130 via the web browser 134 and/or indirectly to the LTS 130 via registration through the marketing apparatus 140. A record of the user 101A is then kept with the LTS 130 and/or the marketing apparatus 140.

In block 310, the LTS 130 registers IR transmitters 110 with the LTS 130. That is, in certain example embodiments, the identity of one or more IR transmitters 110 is recorded in an IR transmitter log 137 of the LTS 130. For example, an operator of the LTS 130 may scan the IR transmitters 110 via the IR reader so that their identity is recorded with the LTS 130, such as in an IR transmitter log 137 of the data storage unit 135 of the LTS 130. Additionally or alternatively, the operator may manually input the identity of each IR transmitter 110 into the LTS 130, such as via the web browser 134 of the LTS 130. The data processing module 132 then records the identity of the IR transmitters 110 in the IR transmitter log 137. The IR transmitter identity can be any type of unique identifier, such as a series of numbers, letters, or characters, that is encoded within the IR signal that the IR transmitter 110 emits. For example, the IR transmitter identity may be ABC for a given IR transmitter. When the IR transmitter emits its signal, encoded within the IR signal is the identity ABC.

In block 315, for embodiments in which it is desirable to know the identity of the user 101A, the LTS 130 associates registered IR transmitters 110 with registered users 101A. That is, an indication that a particular IR transmitter 110 is to be provided to a particular user 101A is recorded in the user information log with the user's entry. Additionally or alternatively, the user's identity can be recorded in the IR transmitter log 137, such as when the user 101A has not registered with the LTS 130 as described in block 305. For example, if an LTS operator issues user Jane Smith IR transmitter ABC, the operator can access the LTS 130 via the web browser 134. Using the web browser 134, for example, the operator can input an entry identifying Jane Smith as being associated with IR transmitter ABC. The data processing module 132 can then create a record of the Jane Smith-IR-transmitter-ABC association in the user information log and/or the IR transmitter log 137.

In block 320, an IR transmitter 110 is provided to the user 101A. That is, the IR transmitter 110 is attached, directly or indirectly, to the user 110A. For example, when it is desirable to determine that a user's location was in front of an object, the IR transmitter 110 can be part of a badge, such as a smart badge, that is provided the user 101A. The badge, for example, can be placed on the torso of the user 101A so that the IR transmitter 110 faces outward. As such, when the user 101A faces a deployed IR receiver 120 and when the user 101A is close enough to the receiver, the receiver can receive a transmitted IR signal from the user-associated IR transmitter 110 (i.e., from the smart badge). Conversely, and because of the limited range and/or the narrow-beam characteristic of the IR transmitter 110, the IR receiver 120 will not detect a signal when a user 101A wearing a badge does not directly face an object (and hence may not be looking or interacting with the object).

As discussed herein, in certain example embodiments it is desirable to determine the location of the user 101A near a second user 101B, such as facing the second user 101B. In such embodiments, an IR transmitter 110 may be deployed on either or both of the users. For example, the registered IR transmitter 110 may be integrated into a wearable device, such as smart badge, that the user 101A wears on his or her torso. When the user 101A wearing the smart badge faces the second user 101B—who is wearing smart badge with a IR receiver—the IR transmitter 110 associated with the user's smart badge can transmit an IR signal to the IR receiver of the smart badge worn by the second user 101B.

In certain example embodiments, the IR transmitter is provided to the user 101A indirectly, such as by attaching one or more IR transmitters to object that the user carries or pushes. For example, one or more IR transmitters 110 may be attached to a bag, hand cart, basket, shopping cart or other item that the user carries or pushes. When placed on a shopping cart, for example, the one or more IR transmitters 110 can be placed to point at the shelves or objects on the shelves. As such, the one or more IR transmits face a direction that is perpendicular to the direction of the isle. In certain example embodiments, multiple of the IR transmitters can be placed on a shopping cart. For example, one IR transmitter 110 can be placed on the right front of the cart facing the shelves to the right of the cart, whereas a second IR transmitter 110 can be placed on the front left of the cart to face the shelves on the left of the cart. IR transmitters 110 can similarly be placed on the rear of the shopping cart. Thus, as the user 101A moves through an aisle, multiple transmitters can emit an IR signal to previously deployed IR receivers 120 in accordance with the methods and systems described herein.

As those skilled in the art will appreciate based the present disclosure, each of the IR transmitters can be preconfigured for their intended use before they are provided to the user 101A and/or the second user 101B. For example, to detect a user-user interaction as described herein—such as two users interacting at a conference—an operator may adjust the limited range of the IR transmitter to a very short setting, such as the typical distance in which two user's interact. The distance may be 0.5 meter to 1.0 meter, for example, or other such comfortable distance for the users. Likewise, the narrow-beam characteristic of the transmitter may be adjusted to be fairly narrow, such as about 10-20°. With such configurations, the short limited transmission range and/or the narrow beam characteristic ensure that only users facing each other result in a detection event.

In other example embodiments, such as when less accuracy is needed in determining user location, the limited transmission range may be slightly longer, such as about 1-2 meters. Likewise, the narrow-beam characteristic may be adjusted to be broader, such as up to about 90°. Such less-precise configurations, which nevertheless still rely on limited transmission ranges and/or narrow-beam characterizes, may be useful for tracking a user 101A as the user 101A moves through a venue. In other example embodiments, the IR receivers may be adjusted according to methods know in the art be more or less sensitive to the IR transmission, thus allowing further tailoring of the methods and systems described herein to the intended use.

In example embodiments where multiple IR transmitters are in use, such as in user-user interactions via a smart badge as described herein, the IR transmitters 110 may be set to have a random jitter, i.e., a variation in signal pattern, prevent repeated collisions of badge transmissions. The random jitter, for example, prevents two smart badges from always transmitting at exactly the same time and possibly corrupting each other's signals. As those skilled in the art will appreciate in view of this disclosure, the random jitter can be any functional time delay in the signal, such as a few milliseconds.

Returning to FIG. 2, in block 225 of FIG. 2, one or more of the deployed IR receivers 120 receive an emitted IR signal from an IR transmitter 110 associated with a user. That is, as the user 101A (and hence the user's associated IR transmitter 110) move around the venue or when the user 101A stands in front of an object or another user 101B, the IR transmitter associated with the user 101A emits a pre-configured IR signal, i.e., an IR signal with a limited transmission range and/or a narrow-beam characteristic. If the user 101A (and hence the user's associated IR transmitter 110) are within range of a deployed receiver—and the user's position is such that the narrow-beam characteristic of the IR transmitter 110 directs the IR signal to the deployed IR receiver 120—the IR receiver 120 can detect the emitted IR signal.

As an example, if user Jane Smith is issued a smart badge having an IR transmitter 110, and the transmitter has been preconfigured with a limited transmission range of about 1.0 meter, then Jane Smith would need to stand at or within about 1.0 meter of a deployed IR receiver 120 for the signal detection to occur. Likewise, if Jane Smith's IR transmitter has also been preconfigured to have a narrow-beam characteristic of about 20°, then Jane Smith would need to be at or within about 1.0 meter of the IR receiver 120 and aligned with the IR receiver 120 such that the IR receiver 120 would fall within the 20° angle. For a more accurate IR signal detection, for example, the limited transmission range can be preconfigured be about 0.5 meter and/or the narrow-beam characteristic preconfigured at about 10°. For a detection that is less accurate but that may capture more signals, for example, the limited transmission range can be preconfigured be about 2 meters and/or the narrow-beam characteristic preconfigured at about 45°.

In block 230, the IR receiver 120 transmits signal data to the LTS 130 and the LTS 130 receives the signal data as a detection event. For example, upon receiving the emitted IR signal as described in block 225, the IR signal processor 121 of the IR receiver 120 processes the received signal into signal data. The IR signal processor 121 then transmits the signal data to the LTS 130, such as via the network 105 and/or the IR reader 131. The LTS 130 then receives the signal data over the network 105 and/or the IR reader 131. The signal data may include, for example, an identity of the IR transmitter from which the IR receiver received the IR signal, an identity of the IR receiver, and the time the IR receiver received the IR signal. In certain example embodiments, the signal data may also include the length of time that the IR receiver received the IR signal.

In certain example embodiments, the IR signal processor 121 decodes the identity of the IR transmitter from which the IR signal was received. For example, if the IR transmitter is transmitter ABC, then the ABC identity code is encoded within the signal, and the IR signal processor 121 decodes the identity from the IR signal. In other example embodiments, the encoded IR signal information may be transmitted to the LTS 130 as part of the signal data, in which case the LTS 130, such as via the data processing module 132, decodes the IR transmitter's identity.

In certain example embodiments, receipt alone of the signal data constitutes a detection event for the LTS 130. In other example embodiments, the data processing module 132 of the LTS 130 may determine from signal data the length of interaction between the IR transmitter 110 and the IR receiver 120, i.e., the length of time the signal was received. A short time, for example, may suggest that the detection was aberrant, whereas a longer time is more likely an indication of an interaction of the user 101A with an object or another user 101B. In such embodiments, if the length of time falls below a threshold amount of time, the LTS 130 may determine that no detection event exists, despite receiving the signal data. But if in such embodiments the LTS 130 determines that the length-of-time threshold is met or exceeded, the LTS 130 determines that a detection event has occurred. For example, the threshold may be about 2, 3, 4, 5, 6, 7, 8, 9, 10, 20, 30, 40, 50, 60 or more seconds.

In block 235, the LTS 130 determines the location of the user 101A based on the detection event. For example, the LTS places the user in front of an object, in a particular location, in front of another user 101B, at any other specific location. The details of block 235 are described in further detail below with reference to FIG. 4.

Figure 4:
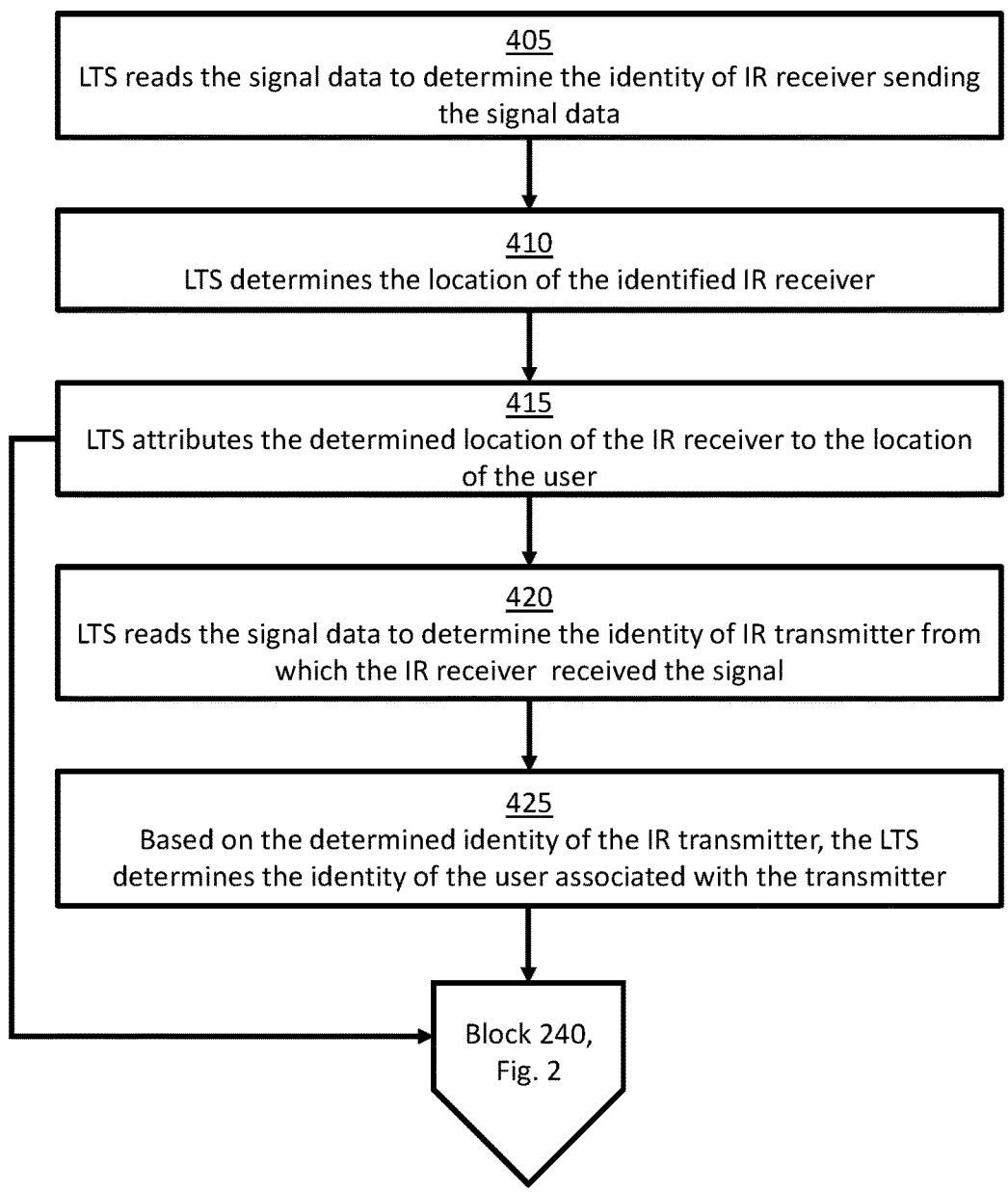
FIG. 4 is a block flow diagram depicting a method for processing a detection event to determine user location, in accordance with certain example embodiments.

FIG. 4 is a block flow diagram depicting a method for processing a detection event to determine user location, in accordance with certain example embodiments. In block 405 of FIG. 4, the LTS 130 reads the signal data to determine the identity of IR receiver sending the signal data. That is, the data processing module 132, for example, analyzes the received signal data and determines, based on the analysis, the identity of the IR receiver 120 that received the IR signal (and hence generated the signal data). If the IR receiver 120 that received the IR signal (and hence generates the signal data) is receiver XYZ, for example, the data processing module 132 determines that the IR receiver identity is receiver XYZ.

In block 410, the LTS 130 determines the location of the identified IR receiver 120. For example, once the LTS 130 determines the identity of the IR receiver 120, the LTS 130, such as via the data processing module 132, reads the IR receiver log 136 to locate the entry corresponding to the IR receiver identity. The data processing module 132 then determines, based on the IR receiver entry, the location that is recorded with the entry. For example, if the identity of the IR receiver 120 from the signal data is IR receiver XYZ, the data processing module 132 reads the IR receiver log 136 and identifies the entry for IR receiver XYZ. The data management model 132 then reads the entry for IR receiver XYZ to determine the location associated with IR receiver XYZ. If, for example, IR receiver XYZ is attached to a particular object, such as a grocery store item with code 4500X23, then the data processing module 132 determines that IR receiver XYZ is attached to the item 4500X23.

In other example embodiments, such as if IR receiver XYZ is part of a smart badge issued to a second user 101B, the data processing module 132 determines that IR receiver XYZ is associated with the second user 101B. In certain example embodiments, such as where it is desirable to know the identity of the user 101B associated with the IR receiver 120, the LTS 130 can determine from the IR receiver log 136 that the IR receiver is associated with a particular user. For example, if user John Doe has been associated with IR receiver XYZ in the IR receiver log 136, then the LTS 130 can determine, such as via the data processing module 132, that IR receiver XYZ belongs to John Doe.

In block 415, the LTS 130 attributes the determined location of the IR receiver 120 to the location of the user 101A. That is, once the LTS 130 determines the location of the IR receiver 120, the LTS 130, such as via the data processing module 132, assigns the location of the IR receiver to the user 101A. For example, if IR receiver XYZ is located on a particular object, such as a grocery store item 4500X23, the LTS 130 determines that the user 101A was at the location of the item, such as standing in front of item 4500X23. If, for example, the LTS 130 determines that receiver XYZ is associated with another user 101B, such as on a smart badge of the second user, the LTS 130 determines that the user 101A was at the location of the second user 101B. In certain example embodiments, such as when multiple IR transmitters are deployed on a shopping cart, the LTS 130 may determine the orientation of the user 101A in the venue, such as the orientation of the shopping cart within a grocery store aisle.

In certain example embodiments, the LTS 130 may attribute information to the user 101A in addition to attributing a location to the user 101A. For example, the data processing module 132 may determine, based on reading the received signal data, that the user location of the user 101A was in front of an object for a given amount of time. Continuing with the grocery store item example, in such embodiments the data processing module 132 may determine that the user 101A was in front of grocery store item 4500X23 for 20 seconds. Likewise, in certain other example embodiments, the LTS 130 may determine that the user 101A was standing in front of another user 101B for a given amount of time. The LTS 130 may also determine from the signal data the date and time of the interaction between user 101A and user 101B.

Notably, attributing the determined location of an IR receiver to a user 101A in order to determine a user location of the user 101A is based on the limited transmission range and/or narrow-beam characteristic of the IR transmitter 110. More particularly, because of these features of the IR transmitter 110, a detection event evidences that the user 101A with a user-associated IR transmitter 110 was close enough to the IR receiver 120 so that the receiver could detect the limited range and/or narrow signal. Thus, the determined location of the IR receiver can be correlated with the location of the user 101A, in accordance with the methods and systems described herein.

As noted above, in certain example embodiments it is not necessary to determine the identity of the user 101A associated with a detection event. For example, a merchant may want to monitor how many times multiple users stand in front of an advertisement on which a IR receiver has been placed, without regard to the actual identity of any of the users. Or, by placing multiple IR receivers in grocery stores aisles and associating IR transmitters with shopping carts, the merchant can track the common paths users travel in the merchant store, without regard to the user's actual identity.

In another example embodiment where user identity is not needed, a museum or art gallery may use a detection event as a trigger to play audio for the user. For example, when a user 101A associated with an IR transmitter stands in front of a painting that has an IR receiver attached, generation of a detection event based on a signal detection at the painting may trigger the playing of audio about the painting as the user 101A stands in front of the painting. Again, in such embodiments, knowing the actual identity of the user 101A is not necessary. Hence, in such embodiments, it is not necessary for the IR transmitter to be registered or the user 101A to register with the LTS 130 as described herein. Rather, the detection event alone can be used to determine a user location of the user 101A without regard to the actual identity of the user 101A. As such, in such embodiments, the method returns to block 240 of FIG. 2.

When it is desirable to determine the actual identity of the user 101A, such as to communicate contact information between two users and in various marketing embodiments, the method proceeds to block 420 of FIG. 4. In block 420, the LTS 130 reads the signal data to determine the identity of IR transmitter from which the IR receiver received the signal. That is, the data processing module 132, for example, analyzes the received signal data and determines, based on the analysis, the identity of the IR transmitter 110 that transmitted the IR signal. For example, if the IR transmitter 110 is transmitter ABC, then the LTS 130 will read the signal data to determine that the IR transmitter 110 is transmitter ABC.

In block 425, based on the determined identity of the IR transmitter 110, the LTS 130 determines the identity of the user associated with the transmitter. That is, based on the determined identity of the IR transmitter 110, the LTS 130, such as via the data processing module 132, reads the IR transmitter log 137 of the data storage unit 135 to identify the user information corresponding to the IR transmitter identity. For example, if IR transmitter ABC is recorded in the IR transmitter log 137 as being provided to user Jane Smith, then the LTS determines that user Jane Smith. The method then follows to block 240 of FIG. 2.

In block 240 of FIG. 2, the LTS 130 optionally determines an activity of the user 101A and/or 101B. That is, based on the determination of the user location as described herein—such as with respect to another user, an object, or a particular location within a venue—the LTS 130 can, in certain example embodiments, make inferences about what a user is (or was) doing at a venue. For example, a user location in which user 101A is placed directly in front of user 101B can result in an inference that user 101A and user 101B met and interacted with one another (especially if the length of the interaction is long, as described herein). If the user location is near another object, it can be inferred that the user looked at or otherwise interacted with the object. Such inferences are particularly useful, for example, for applications such as marketing to users based on their interactions with other objects or other users, exchanging information between users, assessing user routs or paths through a venue, and the like.

For example, by determining that a user 101A stood in front of a grocery item for an extended period of time, the LTS 130 can infer that the user's activity involved viewing and/or examining the object and that hence that the user had an interest in the item. If at checkout it is determined that the user 101A did not purchase the item, for example, the marketing apparatus 140 may send the user a coupon for the item, with the goal of inducing the user to purchase the item on his or her next trip to the grocery store. In other example embodiment, the marketing apparatus 140 may, via the methods and systems described herein, determine a path that a user 101A typically uses as the user moves through a store. For example, the LTS 130 may determine that a user 101A typically shops the periphery of the grocery store. Hence, the marketing apparatus 140 may send coupons to the user 101 that are relevant to items placed on the periphery of the store.

In certain example embodiments, by deploying multiple IR receivers at the venue, such as along grocery store shelves, conventional speed and velocity determinations can be obtained by measuring the time between detection events arising from IR receivers that are spaced known distances apart. For example, if a user 101A moves through an aisle and the deployed IR receivers detect IR signals from transmitters associated with the user's cart, the resulting detection events can be used to determine the user's speed and/or velocity. For example, if IR receivers spaced 10 meters apart each transmit a detection event that are 1 min apart, the user's velocity is 10 meters per minute in the aisle. The LTS 130 can thus infer that the user's activity involved a slow walk through the aisle, and hence send the user 101A coupons or other rewards relevant to items in the aisle, either in real time on the user's mobile device or via other conventional marketing avenues.

In certain example embodiments, the multiple IR transmitters 110 are deployed on an object, such as a shopping cart. For example, the IR transmitters 110 can be placed on the front and back of the shopping cart. Because each of the IR transmitters 110 have different identities, the receipt of an emitted IR signal by one or more IR receivers 120 can provide an indication of the orientation of the shopping cart in the aisle. For example, the LTS 130 can determine where and when the user 101A made turn with the shopping cart.

As those skilled in the art will appreciate based on this disclosure, the methods and systems described herein of determining a user's location are useful in a host of different applications.

Figure 5A:
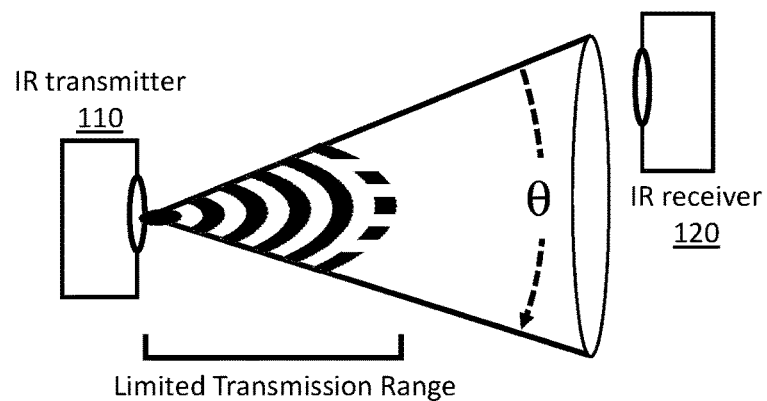
FIG. 5A is an illustration showing an IR transmitter with a limited transmission range and an example narrow-beam characteristic, in accordance with certain example embodiments.

FIG. 5A is an illustration showing an IR transmitter with a limited transmission range and an example narrow-beam characteristic, in accordance with certain example embodiments. As shown, the IR transmitter 110 has a transmission range of a given length, the length of which is configurable as described herein. That is, the length is configurable based the desired accuracy of the IR transmitter/IR receiver interaction. For example, the limited transmission range can be about 0.5 meters when a very accurate interaction is desired (as compared to about 2 meters when a less precise interaction is sufficient). In the example shown, the limited transmission range is too short to reach the IR receiver 120, even though the IR receiver 120 is within the narrow-beam characteristic (represented by angle θ). If, for example, the IR receiver 120 were moved at or within the limited transmission range—and the IR receiver remained within narrow-beam of the IR signal—the IR receiver 120 would detect the IR signal from the IR transmitter. In certain example embodiments, the narrow-beam characteristic is also adjusted for enhanced precisions, such as by narrowing the angle of the beam.

Figure 5B:
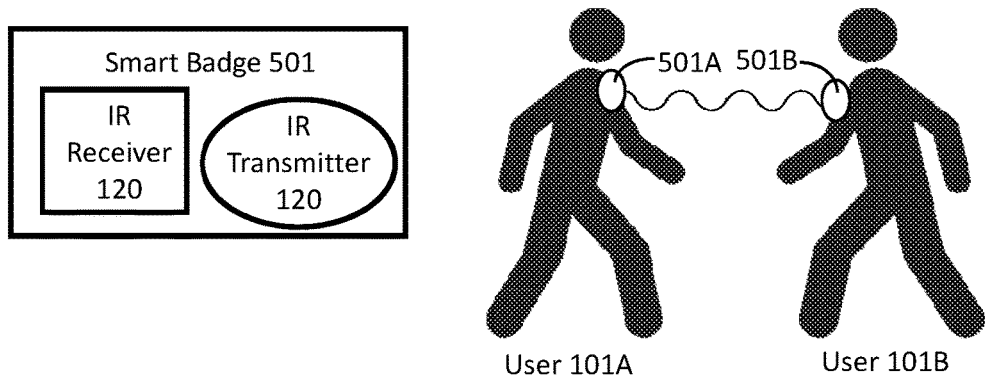
FIG. 5B is an illustration showing a user-user interaction via a smart badge, in accordance with certain example embodiments.

FIG. 5B is an illustration showing a user-user interaction via a smart badge, in accordance with certain example embodiments. As shown, the example smart badge 501 includes an IR transmitter 110 and an IR receiver 120. The IR transmitter 110, for example, has a limited transmission range and/or a narrow beam characteristic. To detect a user-user interaction, smart badges are issued to user 101A and 101B at a conference. For example, smart badge 501A is associated with user 101A, and smart badge 501B is associated with user 101B. The identity of user 101A and 101B are registered with the LTS 130 before the smart badges are deployed to the users. The IR transmitters are also preconfigured, for example, to have a random jitter that prevents signal degradation of the IR signal. One smart badge 501A is then placed on the torso of user 101A while the other smart badge 501B is placed on the torso of user 101B, and the users are free to move about the venue.

When user 101A and 101B stand close enough and face each other—i.e., within the limited transmission range of one of the IR transmitters and within the angle of the IR signal—an IR signal is detected. That is, the IR receiver in either of the badges detects an emitted transmission signal from the IR transmitter of the other smart badge. For example, an IR transmitter 110 of badge 501A transmits an IR signal that is received by the IR receiver 120 of badge 501B. The IR receiver 120 of badge 501B then transmits signal data to the LTS 130. The LTS 130 then reads the signal data and identifies a detection based on the IR transmitter-receiver interaction.

From the signal data, the LTS's identifies the user location of user 101A as being in front of user 101B, thus providing an indication of the interaction between user 101A and 101B. The LTS 130 then identifies each of the users based on the user's registration information with the LTS. Based on the users' identities, the LTS 130 and or the marketing apparatus 140 can send each of the user's information about the interaction. For example, the LTS 130 may notify the users of the data and time of the interaction, the length of the interaction, and the name and contact information of the users. As those skilled in the art will appreciated based on this disclosure, in certain example embodiments one smart badges may preconfigured to have only an IR transmitter 110 while the other smart badge has only an IR receiver 120.

Figure 5C:
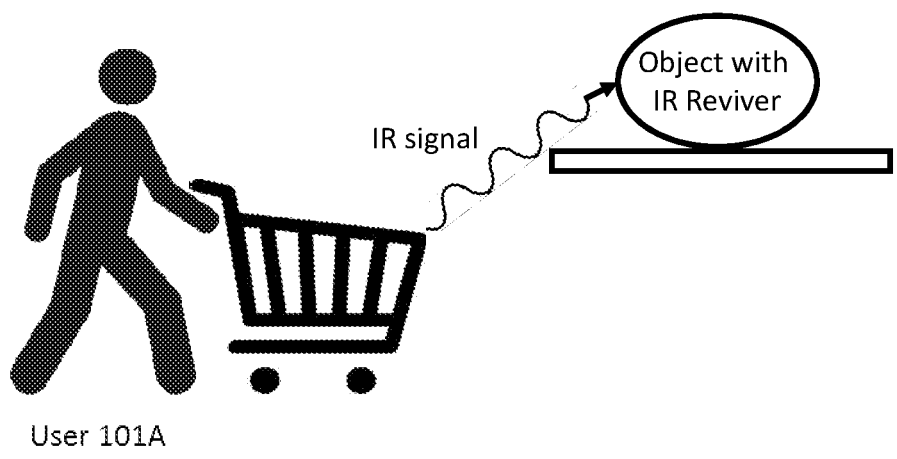
FIG. 5C is an illustration showing a user's shopping cart interacting with an object on a shelf, in accordance with certain example embodiments.

FIG. 5C is an illustration showing a user's shopping cart interacting with an object on a shelve, in accordance with certain example embodiments. As shown, the user 101A's shopping cart is outfitted with an IR transmitter 110 emits an IR signal to objects on the store shelf. The object, whose identity is registered with the LTS 130, is outfitted with an IR receiver 120 for receiving the IR signal. As the user 101A moves the shopping cart close enough to the object—i.e., within the limited transmission range of the IR signal and/or the narrow beam characteristic—the IR receiver 120 receives the IR signal. The IR receive 120 then transmits signal data to the LTS 130 and the LTS 130 determines a detection event. The LTS 130 then determines the user location as being in front of the object.

In certain example embodiments, such as when the user's identity is associated with the IR transmitter deployed on the user's cart, the identity of the user can be associated with the user location. For example, the LTS 130 may determine the user's name and the date and time the user 101A was in front of the object. The LTS 130 can also determine from the signal data the amount of time the user 101A spent in front of the object. In certain example embodiments, upon checkout the cashier may determine that the user 101A did not purchase the object. Hence, a marketing apparatus 140 may send the user 101A coupon for the item. Additionally or alternatively, the marketing apparatus 140 may send the user 101A coupons for the item while the user 101A is standing in front of the item.

Example Computing Environment

Figure 6:
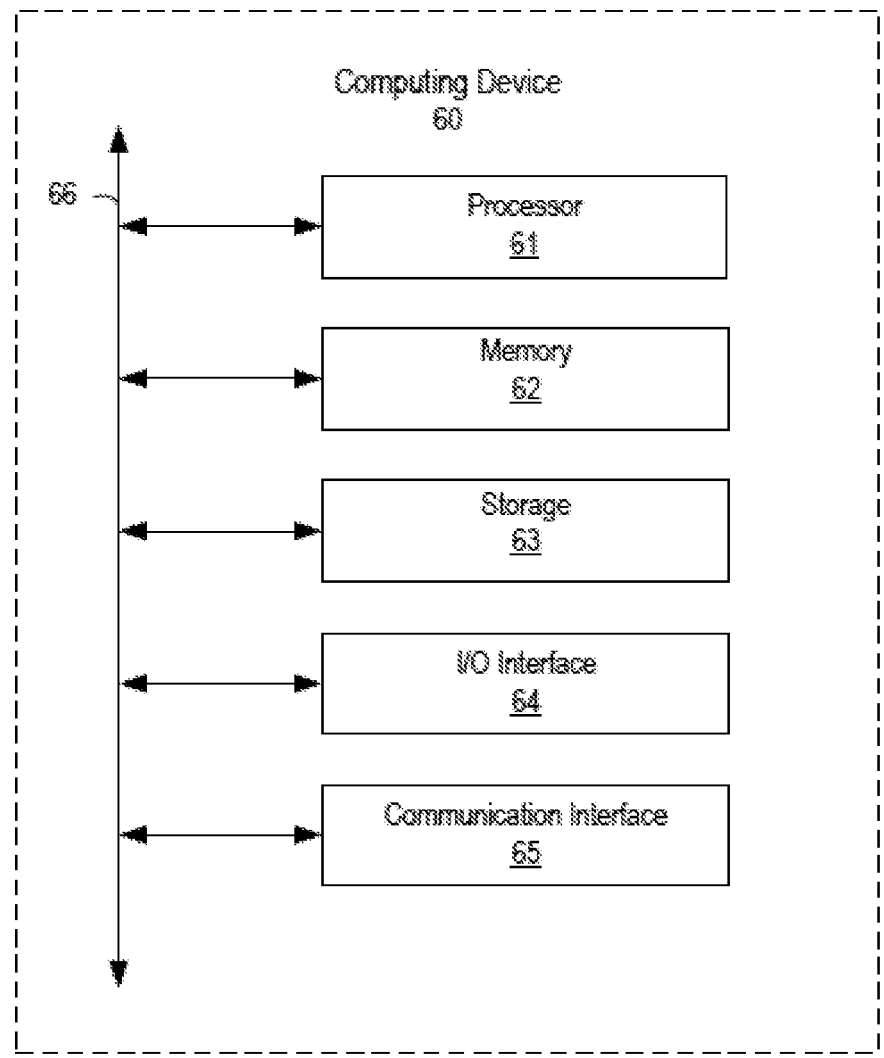
FIG. 6 is a block diagram depicting an example hardware implementation, in accordance with certain example embodiments.

Any suitable computing system or group of computing systems can be used to implement the techniques and methods disclosed herein. For example, FIG. 6 is a block diagram depicting examples of implementations of such components. The computing device 60 can include a processor 61 that is communicatively coupled to a memory 62 and that executes computer-executable program code and/or accesses information stored in memory 62 or storage 63. The processor 61 may comprise a microprocessor, an application-specific integrated circuit ("ASIC"), a state machine, or other processing device. The processor 61 can include one processing device or more than one processing device. Such a processor can include or may be in communication with a computer-readable medium storing instructions that, when executed by the processor 61, cause the processor to perform the operations described herein.

The memory 62 and storage 63 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 60 may also comprise a number of external or internal devices such as input or output devices. For example, the computing device is shown with an input/output ("I/O") interface 64 that can receive input from input devices or provide output to output devices. A communication interface 65 may also be included in the computing device 60 and can include any device or group of devices suitable for establishing a wired or wireless data connection to one or more data networks. Non-limiting examples of the communication interface 65 include an Ethernet network adapter, a modem, and/or the like. The computing device 60 can transmit messages as electronic or optical signals via the communication interface 65. A bus 66 can also be included to communicatively couple one or more components of the computing device 60.

The computing device 60 can execute program code that configures the processor 61 to perform one or more of the operations described above. The program code can include one or more modules. The program code may be resident in the memory 62, storage 63, or any suitable computer-readable medium and may be executed by the processor 61 or any other suitable processor. In some embodiments, modules can be resident in the memory 62. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for determining a user location at a venue using infrared (IR) transmissions, the method comprising:

receiving a detection event from an IR receiver deployed in the venue at a receiver location and with a receiver orientation, the detection event detected based on the IR receiver receiving an IR signal from an IR transmitter of a user at the venue, the IR transmitter having a transmitter location and a transmitter orientation at a time of the detection event;

determining the receiver location and the receiver orientation of the IR receiver at the venue;

determining a user location at the venue based on the detection event, the receiver location, and a limited transmission range of the IR transmitter, wherein the determining the user location is also based on a narrow-beam characteristic of the IR transmitter, including a determination that the IR receiver is within a pre-defined transmission angle of the IR transmitter associated with the narrow-beam characteristic; and determining a user orientation of the user relative to the IR receiver, based on the receiver orientation and the transmitter orientation, relative to one another.

2. The method of claim 1, wherein the limited transmission range of the IR transmitter is about 1.0 meter and wherein user location is an area within the venue.

3. The method of claim 1, wherein determining the location of the user comprises approximating a direction that the user faces or moves based on the narrow-beam characteristic of the IR signal, wherein the narrow-beam characteristic of the IR transmitter provides a beam of less than about 90 degrees.

4. The method of claim 1, wherein the venue is a merchant store, wherein the IR transmitter is attached to a merchandise transportation device, and wherein the merchandise transportation device is a shopping cart, a shopping bag, or a shopping basket.

5. The method of claim 1, wherein the venue is a merchant store and wherein the IR transmitter is attached to a shopping cart, the method further comprising determining a direction or speed of the shopping cart as the shopping cart is moved through the merchant store based on detecting IR signals from multiple IR transmitters positioned on the shopping cart.

6. The method of claim 1, further comprising determining an identity of the user and associating the identity of the user location.

7. The method of claim 1, wherein the IR receiver is located on an object and wherein determining the location of the user comprises determining that the user was in front of the object.

8. The method of claim 1, wherein determining the user location comprises determining that the user location was in front of a second user based on the IR receiver being associated with the second user.

9. The method of claim 8, wherein a first wearable device is worn by the user, a second wearable device is worn by the second user, and wherein the first wearable device comprises the IR transmitter and the second wearable device comprises the IR receiver.

10. The method of claim 9, wherein determining the user location was in front of a second user comprises
determining that the user faced the second user based on the narrow-beam characteristic of the transmission device and wearable devices worn on front torsos of the first user and second user; and
determining that the user was within a predetermined distance of the second user based on the limited transmission range of the IR transmitter.

11. The method for claim 10, wherein determining that the user was within a predetermined distance of the second user based on the limited transmission range of the IR transmitter provides an indication that the user interacted with the second user.

12. The method of claim 11, further comprising providing information to the user or the second user based on the indication that the user interacted with the second user.

13. A system for determining a user location at a venue using infrared (IR) transmissions, the system comprising:
a processor; and
a non-transitory computer readable medium comprising instructions, wherein, when the instructions are executed by the processor, the processor preforms operations comprising:
receiving a detection event from an IR receiver deployed in the venue at a receiver location and with a receiver orientation, the detection event detected based on the IR receiver receiving an IR signal from an IR transmitter of a user at the venue, the IR transmitter having a transmitter location and a transmitter orientation at a time of the detection event;
determining, from signal data associated with the detection event, the receiver location and the receiver orientation of the IR receiver at the venue;
associating the receiver location of the IR receiver with the user;
determining a user location of the user at the venue based on the receiver location associated with the user, a limited transmission range of the IR transmitter, and a narrow-beam characteristic of the transmitter, wherein the determining the user location includes determining that the IR receiver is within a pre-defined transmission angle of the IR transmitter associated with the narrow-beam characteristic; and
determining a user orientation of the user relative to the IR receiver, based on the receiver orientation and the transmitter orientation, relative to one another.

14. The system of claim 13, wherein the limited transmission range of the IR transmitter is within about 1.0 meter and wherein the narrow-beam characteristic of the IR transmitter provides a beam of less than about 90 degrees.

15. The system of claim 14, wherein the IR receiver is attached to an object at the venue and wherein the determining the location of the user comprises determining that the user was in front of the object.

16. The system of claim 13, wherein a first wearable device is worn by the user, a second wearable device is worn by the second user, and wherein the first wearable device comprises the IR transmitter and the second wearable device comprises the IR receiver.

17. The system of claim 15, wherein determining the user location comprises determining that the user was in front of the second user based on the second wearable device receiving the IR signal from the IR transmitter of the first wearable device.

18. A non-transitory computer readable medium containing instructions for causing a computing device to perform operations comprising:
receiving a detection event from an IR receiver deployed in the venue at a receiver location and with a receiver orientation, the detection event detected based on the IR receiver receiving an IR signal from an IR transmitter of a user at the venue, the IR transmitter having a transmitter location and a transmitter orientation at a time of the detection event;
determining the receiver location and the receiver orientation of the IR receiver at the venue;
determining a user location at the venue based on the detection event, the receiver location at the venue, and a limited transmission range of the IR transmitter, wherein the determining the user location is also based on a narrow-beam characteristic of the IR transmitter, including a determination that the IR receiver is within a pre-defined transmission angle of the IR transmitter associated with the narrow-beam characteristic; and determining a user orientation of the user relative to the IR receiver, based on the receiver orientation and the transmitter orientation, relative to one another.

19. The non-transitory computer readable medium of claim 18, wherein the limited transmission range of the IR transmitter is about 1.0 meter, and wherein user location is an area within a venue, in front of an object, or in front of a second user.

\* \* \* \* \*